United States Patent [19]
Parsons

[11] Patent Number: 5,148,886
[45] Date of Patent: Sep. 22, 1992

[54] SAFETY CONTROL FOR VEHICLES

[76] Inventor: Gary W. Parsons, 735 E. 400 South, Orem, Utah 84057

[21] Appl. No.: 420,011

[22] Filed: Oct. 11, 1989

Related U.S. Application Data

[63] Continuation of Ser. No. 143,670, Jan. 14, 1988, abandoned, which is a continuation-in-part of Ser. No. 941,696, Dec. 15, 1986, abandoned.

[51] Int. Cl.$^5$ .............................................. B60K 28/14
[52] U.S. Cl. ..................................................... 180/275
[58] Field of Search ............... 180/275, 274, 277, 279; 293/5, 4, 2

[56] References Cited

U.S. PATENT DOCUMENTS

| | | | |
|---|---|---|---|
| 1,176,195 | 3/1916 | Biale | 180/277 |
| 1,586,461 | 5/1926 | Padovani | 180/275 |
| 3,752,250 | 8/1972 | Speer | 180/2 |
| 3,923,330 | 12/1975 | Viall, Sr. et al. | 293/4 |
| 3,942,603 | 3/1976 | Pesonen | 180/275 |
| 4,126,344 | 11/1978 | Vaill | 293/4 |
| 4,591,019 | 5/1986 | Fisher et al. | 180/275 |
| 4,683,974 | 8/1987 | Richardson | 180/274 |
| 4,688,656 | 8/1987 | Kent | 180/279 |
| 4,705,136 | 11/1987 | Godsoe, Sr. et al. | 180/277 |
| 4,799,570 | 1/1989 | Andersson et al. | 180/275 |

FOREIGN PATENT DOCUMENTS 2007321  5/1979  United Kingdom ................ 180/275

OTHER PUBLICATIONS

"Safety Grill Designed for School Buses", *Trailer Built* Jan. 1984.

Primary Examiner—Charles A. Marmor
Assistant Examiner—Karin Tyson

[57] ABSTRACT

The present invention relates to a motor vehicle having a brake mechanism capable of braking the vehicle to a stop, detection means adapted to detect the presence of a foreign object in the direct path only of slow movement of said vehicle on a supporting surface, and control means to apply the brakes and stop movement of said vehicle instantly upon the detection of such an object. The detection means, which preferably is yieldable a sufficient distance upon contact with a foreign object to prevent damage thereto while said vehicle is braked to a stop, may comprise a straight front part as wide as the vehicle with end panels extending at right angles to and away from the straight part, a like rear part, and/or an L-shaped flap on one or both sides of the vehicle having two integral panels with one of them at the front of the rear tires on one or both sides of said vehicle and the other extending along and spaced from the tire. A school bus is a vehicle to which the invention may very advantageously be applied at the front, the rear, and near the right rear tire or near both rear tires. The flap preferably has a rigid upper portion and a flexible lower portion which enables the lower flexible portion to yield if it comes into contact with the supporting surface for the vehicle when it is sufficiently rough and irregular to bring the lower edge into contact with it. The invention includes means for inactivating the control means when the speed of movement of the vehicle exceeds about seven miles per hour or when a predetermined short time interval, e.g., 12 to 15 seconds, has expired.

3 Claims, 12 Drawing Sheets

SAFETY CONTROL FOR VEHICLES

This is a continuation patent application under 37 C.F.R. 1.60 of pending prior application Ser. No. 07/143,670 filed on Jan. 14, 1988, by Gary W. Parson entitled Saftey Control for Vehicles, now abandoned, which is a continuation-in-part of prior application Ser. No. 06/941,696 filed on Dec. 15, 1986, by Gary W. Parson and entitled Vehicle Warning and Braking Device, now abandoned.

The present invention relates to a safety control for vehicles which will stop a vehicle instantaneously when traveling at a slow speed if it comes into contact with an object in its path of movement in either forward or rearward direction. It is intended to operate only when conditions of slow movement obtain, e.g., when starting from a stationary position in either forward or rearward direction, or when driving into a service station, or when backing a garbage truck into a garbage dump, and to be inoperable at other times, e.g., after a predetermined time short interval after starting to move up, or after reaching a predetermined speed of about seven (7) miles per hour. If desired, the safety control may also sound a signal, or illuminate a light, or both, to warn the driver of the vehicle of the presence in his path of movement of such an object. The safety control on the vehicle prevents damage to property and injury to persons.

BACKGROUND OF THE INVENTION

A number of warning devices have been proposed in the past which have the objective of warning operators of vehicles of unsafe conditions in the path of movement. The following U.S. patents, for example, are relevant to this basic concept:

U.S. Pat. No. 2,116,604, which discloses a means for operating the brakes of a vehicle when impact is sensed. The means includes a net to catch persons hit by a vehicle and arms to push persons out of the path of vehicle travel.

U.S. Pat. No. 3,407,874, which discloses a flexible member mounted on a solenoid switch, which switch activates an alarm or horn when the flexible member is deflected by contact with a foreign object. Similar systems are shown in U.S. Pat. Nos. 2,588,815 and 2,720,275 which disclose systems having sensors adapted to engage an object into which a backing vehicle comes in contact and thereupon to activate the vehicle brakes and alarm systems.

One major difficulty with existing systems is that they fail to provide visual warning to alert persons of the danger of being behind a backing vehicle. To overcome this difficulty, the present vehicle control device is provided with a sensor having a large surface that displays warning precautions and at the same time is adapted to activate the brakes and alarm system upon striking or impacting on an object in the path of movement of the vehicle. The vehicle control system of the present invention is adaptable for use on a variety of different sizes and types of vehicles and can be adjusted to determine the size of object which will activate the system.

The known devices do not adequately protect against damage to small objects or injury to small persons in the path of movement of the vehicle provided with them, and, while possibly operable under limited circumstances when the vehicle is traveling on a smooth or uniform surface, do not discriminate between sensor movement caused by surface irregularities and do not provide for manual override of the control circuit to make the system non-operational in situations where operation of brakes is not needed, even though the sensor is actuated.

Furthermore, the known devices are not adaptable to sensing of objects during forward travel of a vehicle and do not sense objects falling from or coming to the side of a vehicle to a position in front of a rear vehicle wheel.

SUMMARY OF THE INVENTION

The principal feature of the invention is the provision of a vehicle control device including a sensor which instantly brakes the slowly moving vehicle automatically if there are objects in the path of its movement which trigger the sensor. The word "objects" as used in the description and claims is to be construed to mean people of any age as well as inanimate things such as a baby stroller, a tricycle, a wheel barrow, a package, and the like. The controller may also alert the driver by signal to the presence of objects in the path of movement of his vehicle.

Another feature of the invention is the provision of means to adjust the sensor to a predetermined height for sensing of objects in the path of movement of the vehicle.

Yet another feature of the present invention is the provision of a sensor which is yieldable, at least in part, so that it will not be damaged, or cause application of the brakes of the vehicle, to protect the sensor from damage and from actuating the vehicle brakes when the sensor engages the ground surface, as may occur when the vehicle hits a chuckhole in the road surface or when crossing deep gutters, and the like.

Still another feature of the present invention is the provision of a flap or shield somewhat like a conventional mud flap in combination with a vehicle warning device. In one embodiment the flap or shield is constructed with a rigid upper section which includes a surface material having reinforcing ribs and flanges and a flexible lower section made of the same continuous surface material which is not reinforced and can deflect to prevent damage to the flap.

Yet other features are the provision of a control device that can be inactivated to prevent brake actuation when contact of the flap is expected with objects, as, for example, when a dump truck is backing into a garbage pit or dump.

An important feature of the invention includes a projecting flap adapted to be yieldingly mounted on a vehicle to activate the brake system upon impact with an object. The control system may include an alarm, e.g., visual and/or audible, as well as the brake actuating means, to operate upon contact of the flap with an object.

A desirable feature of the control device is the provision of means for discriminating between contact of the sensor with an object during movement of the vehicle and inadvertant contact of the sensor with road surface irregularities and whether or not the alarm and brakes will be actuated.

Another desirable feature is the provision of a device which can be set to be operable for a predetermined length of time, e.g., 12 seconds, after starting movement from a stationary position, whereupon it inactivates the system.

A bypass in the control circuit of the system may be provided to allow an operator manually to cut-out the control circuit and hold the circuit in a cut-out position as necessary to allow the vehicle to operate without brake actuation in an area where expected and acceptable contact with objects will occur.

BRIEF DESCRIPTION OF THE DRAWINGS

The foregoing and other features of the invention will become apparent from the following detailed description of preferred embodiments of the presently best know modes of the invention in conjunction with the drawings in which.

DETAILED DESCRIPTION OF PREFERRED EMBODIMENTS OF THE INVENTION

The preferred embodiments of the invention comprise a motor vehicle having in combination a chassis including front and rear wheels and steering mechanism, a motor mounted on the chassis connecting the motor to the driving wheels, a brake mechanism capable of braking the vehicle to a stop, detection means on said vehicle adapted to detect the presence of a foreign object in the direct path only of slow movement of said vehicle on a supporting surface, and control means to apply the brakes and stop movement of said vehicle instantly upon the detection of such an object.

The control device of the invention may also advantageously be mounted on trailers having air brakes which are connected to and moved by another vehicle. When not otherwise excluded from its scope, the word "vehicle" is to be construed to include trucks, busses, other vehicles and trailers.

The detection means used in the invention preferably is yieldable a sufficient distance upon contact with a foreign object to prevent damage thereto while said vehicle is braked to a stop.

The detection means may be at the front of the vehicle, at the rear of the vehicle, or at the front of the rear tires on either or both sides of the vehicle to detect the presence of a foreign object in the path of movement of said detection means. The front and rear detection means each preferably comprises a pivotally mounted flap having upper and lower parallel edges with a straight central portion as long as the vehicle is wide and end portions at right angles thereto extending away from the central portion. The detection means near a rear tire is preferably formed of two flap panels at a large angle to and integral with each other, one being pivotally mounted on the vehicle and the other extending rearwardly. The control means of the invention is intended to be operable only when the vehicle on which it is mounted is moving at a slow speed, e.g., when starting to move from a standing position, or when driving into a service station, or when backing into a garbage dump.

A school bus is a very desirable vehicle on which to mount the control system of the invention.

Means for inactivating the control means when it is desired that it be inoperable, e.g., when the speed of movement of the vehicle exceeds about seven miles per hour, or after the passage of a predetermined time period after starting from a standing position, is an important feature of the invention.

Referring first to FIGS. 1 to 7, inclusive, they disclose one preferred embodiment of the device 10 as applied to the rear of a large truck 12, e.g., a garbage truck. The warning and breaking device 10 includes a flap 14 of generally rectangular configuration as long as the truck is wide. It has parallel upper and lower edges and is pivotally mounted at its rear side on the vehicle with the lower edge a few inches above the surface on which the truck is supported. Caution marks 16 may be applied to the outer surface of flap 14 around its periphery leaving a central surface 18 on which various intelligence may be applied, such as a trademark, caution signs, warning signs, and the like, of a nature related to the type of vehicle to which the device 10 is applied, e.g., delivery vehicles, service vehicles, garbage trucks, construction vehicles, and the like.

Figure 1:
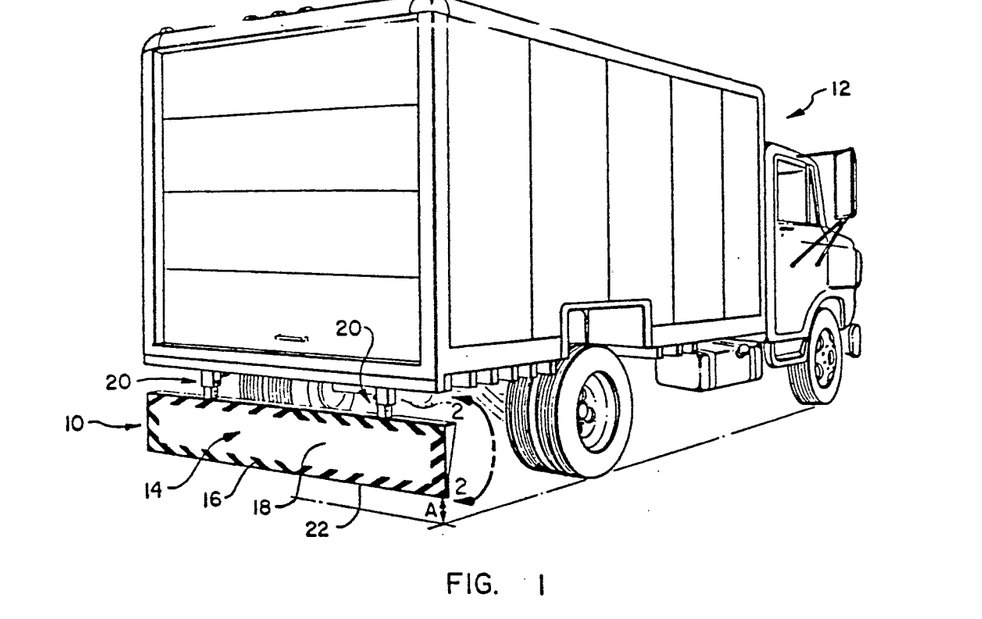
FIG. 1 is a perspective of a preferred embodiment of the vehicle control system mounted at the back of a vehicle.
Figure 2:
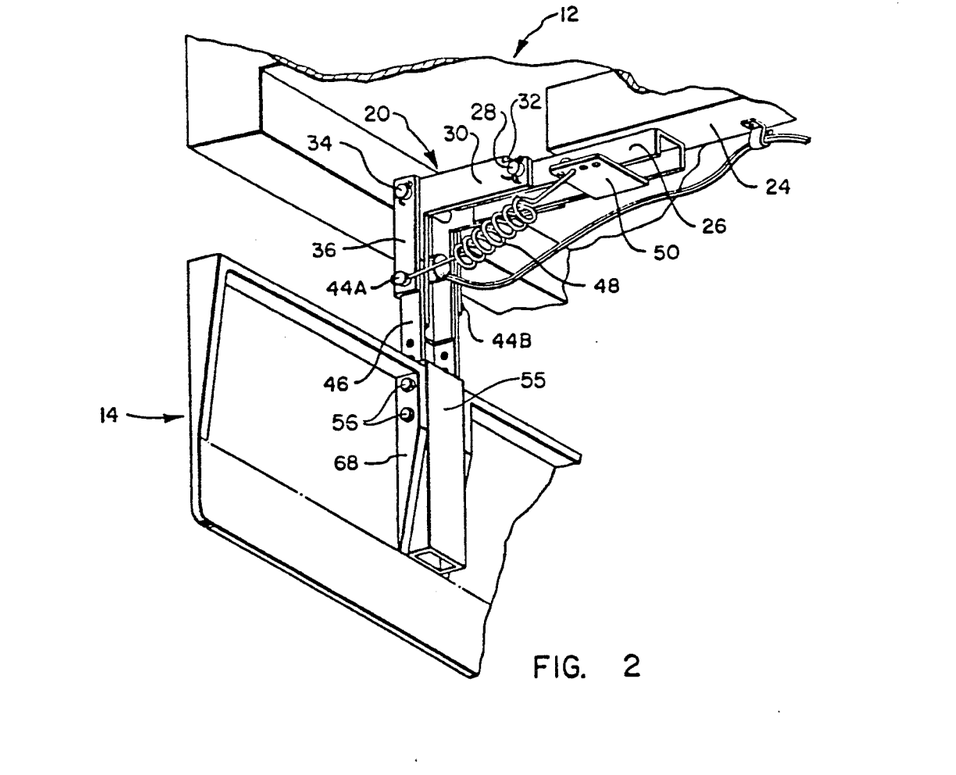
FIG. 2, is a fragmentary exploded perspective view taken on line 2—2 of FIG. 1 looking upward and outward from a position near the right rear tire of the vehicle.

The embodiment of pivotal connection of the flap to the vehicle 12 may comprise a pair of supports 20 seen clearly in FIG. 2. They are preferably so constructed as to provide not only the pivotal connection but also tp permit adjustment of the flap vertically to alter the clearance A (FIG. 1) between the lower edge of the flap and the support surface. It is recognized that different clearances may be desirable for different vehicles. A delivery vehicle, for example, which operates in congested neighborhoods may preferably have minimum clearance in order to function when small articles such as toys are encountered and surely to operate if a child's tricycle or a child is present in the path of the vehicle. Construction vehicles, on the other hand, may operate more satisfactorily with higher clearance to pass over rocks, bricks and other construction related items on the ground without activating the control system but would operate the control system if a person of any age, tool box, bicycle, motorcycle, and the like were encountered.

Figure 12:
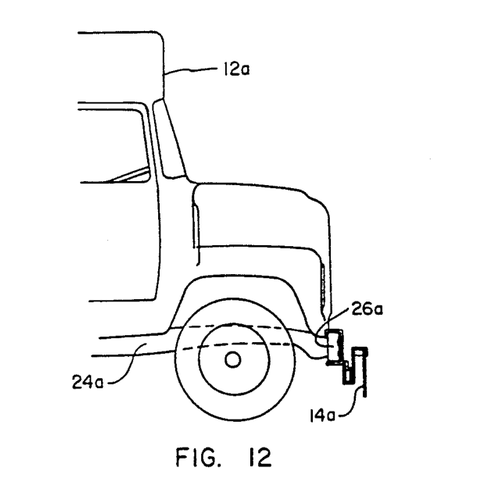
FIG. 12 is a partial side elevation of the front portion of a model of bus somewhat like the bus illustrated in FIG. 11 showing the manner of securing the control device to the front bumper of the vehicle.

A fragment of the vehicle 12 to which a support 20 is secured is shown in FIG. 12. It includes a frame member 24 to which an anchor channel 26 is welded or bolted. A pivot pin 28 passes through the side walls of channel 26 toward the rear end thereof and through the side walls at one end of an L-shaped channel 30 which has had the web cut back to a line 32 so that the L-shaped channel is free to pivot about 28 without the web binding against the web of channel 26. See also FIGS. 4 and 6.

Figure 4:
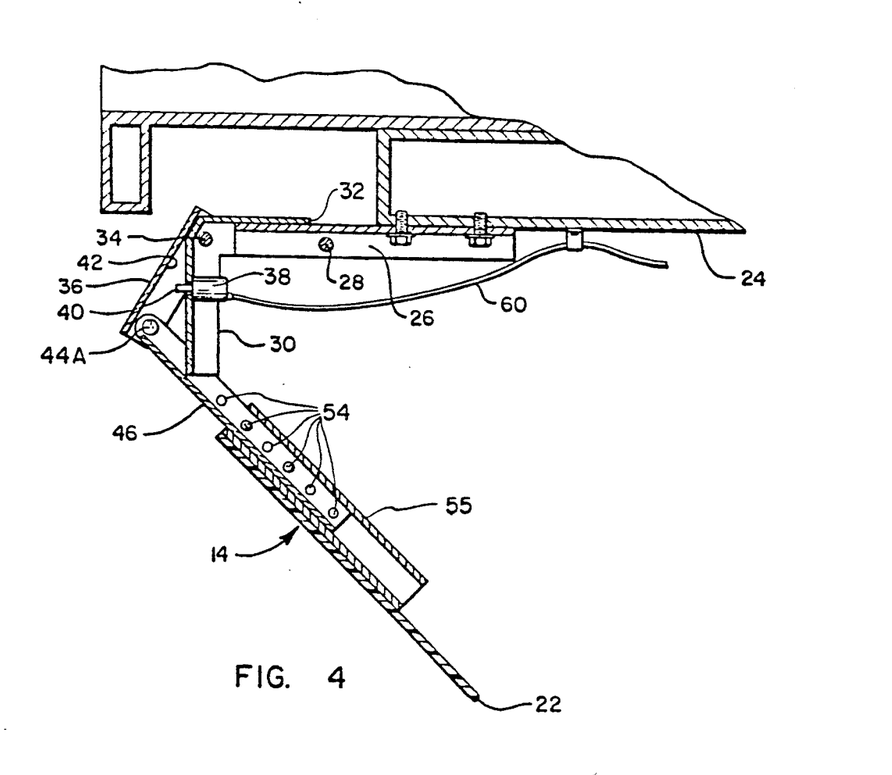
FIG. 4, is a vertical sectional view taken on section line 4—4 of FIG. 3.
Figure 5:
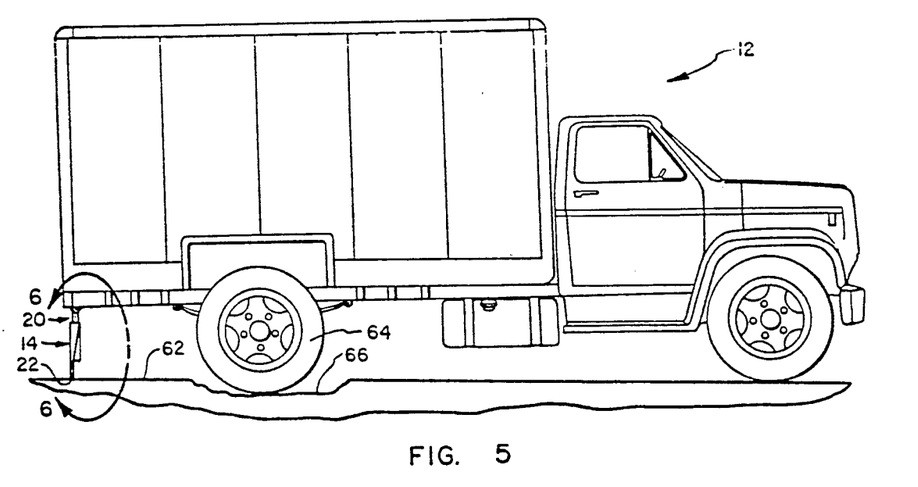
FIG. 5 is a side-elevational view of a vehicle with the vehicle warning and braking device thereon impacting on a ground surface because of a very irregular road surface.
Figure 6:
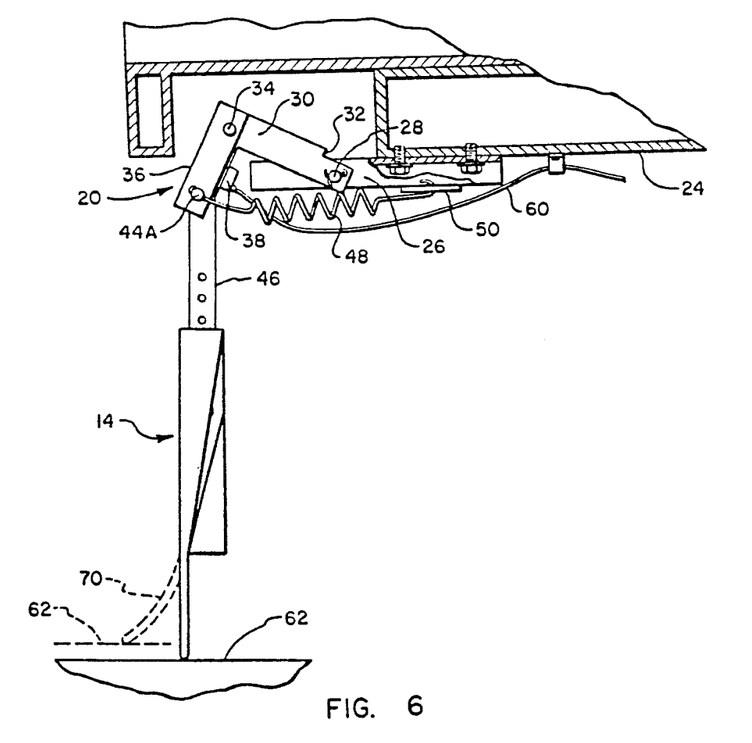
FIG. 6 is a fragmentary vertical sectional view taken on line 6—6 of FIG. 5.

Another pivot pin 34 passes through the web of L-shaped channel 30 adjacent to the right angle corner of the two arms thereof and through the side walls of a larger support channel 36 which fits over the adjacent arm of L-shaped channel 30. This permits limited rotation of channel 36 about pivot pin 34 as seen in FIG. 4.

A switch 38 having a push button 40 is secured to the inside of the web of the arm of L-shaped channel 30 which channel 36 fits over with the push button 40 passing through a hole in the web so that the push button will be depressed when channel 36 lies against said arm of channel 30, as illustrated in FIG. 2.

The side walls of channel 36 are provided, respectively, with pivot posts 44a and 44b to connect it pivotally with a channel 46. Post 44a also provides a connection for one end of a spring 48 whose other end can be hooked in a selected one of a plurality of holes in a plate 50 welded or otherwise secured across the side walls of channel 26, as seen in FIG. 2. In this manner the tension on spring 48 can be adjusted.

The side walls of channel 46 have aligned, spaced holes 54 along the major length thereof for the purpose of providing a connection of adjustable length with a sleeve 55 of rectangular cross section in which channel 46 is snugly slidable. As seen best in FIGS. 2, 4, and 6, two sleeves 55 are secured in spaced relation to the upper, rigid portion of flap 14. Bolts 56 secure channel 46 and tube 55 together after adjustment in length to give flap 14 the proper clearance from the supporting surface of the vehicle.

Figure 3:
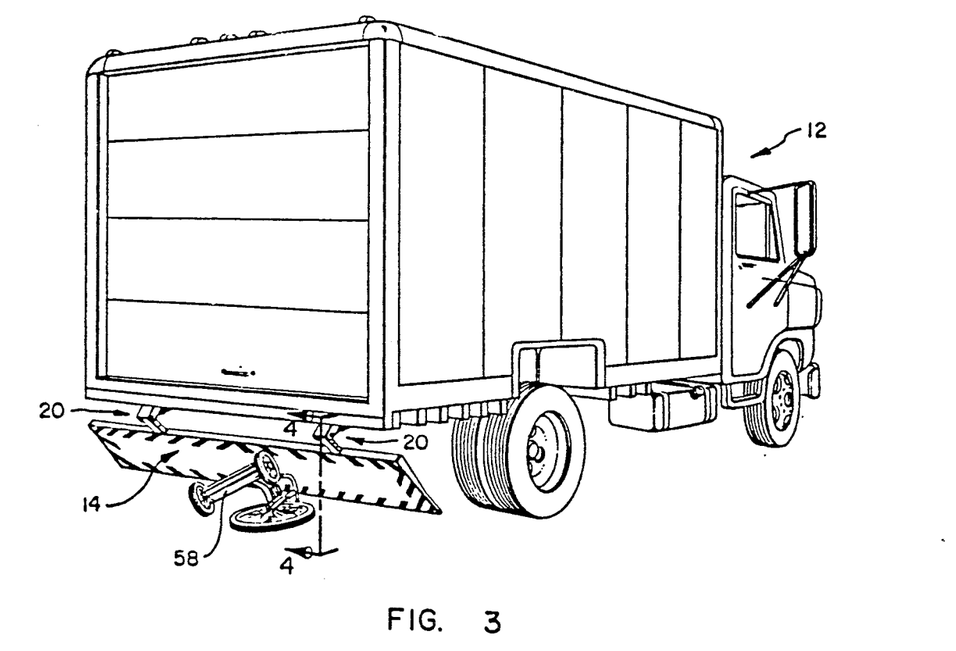
FIG. 3, is a perspective view of the vehicle of FIG. 10 after contact of the control device with an object, a child's tricycle, during backward movement.

The embodiment of the invention shown in FIGS. 1 to 7 operates to stop the vehicle 12 if, in backing, flap 14 encounters a foreign object, such as a child's tricycle 58, as shown in FIG. 3. Contact with the tricycle 58 causes the flap to pivot inwardly from the position shown in FIG. 2, in which web 42 holds push button 40 depressed, to the position shown in FIG. 4 where channel member 36 has been rotated clockwise about pivot pin 34 and counterclockwise about pivot pin 44b by contact of channel member 46 with the end of L-shaped channel 30 as it is rotated counterclockwise by the inward movement of flap 14 caused by the tricycle 58. This movement causes web 42 to be lifted to free push button 40 and actuate switch 34 which sends a signal through wire 60 to apply the brakes of vehicle 12 and instantly stop movement of the truck 12. Freeing push button 40 may also actuate the alarm to alert the driver of the presence of some foreign object in the path of the backward movement of the truck.

Figure 7:
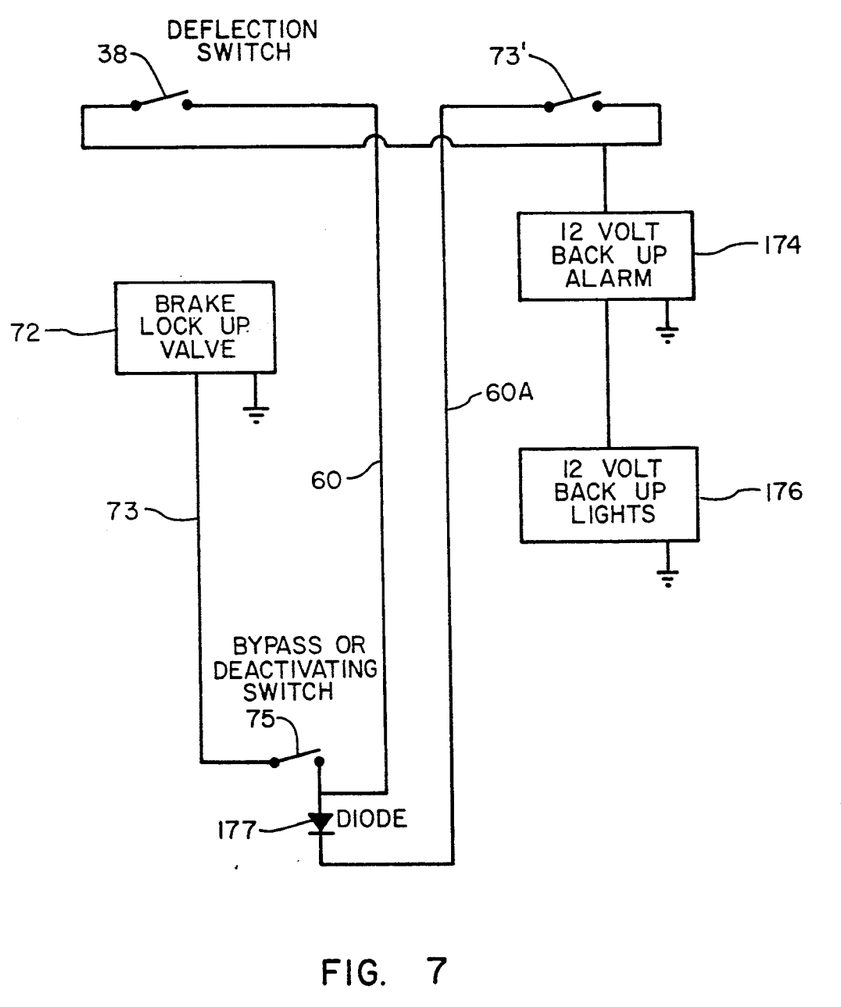
FIG. 7 is a schematic diagram of an electrical circuit for the vehicle control system adapted for braking control.

FIG. 7 shows a suitable electric circuit for the system just described with the switches 38 in the open position they occupy when the flap 14 is in the position shown in FIG. 2. When flap 14 is moved to the position shown in FIG. 4 by contact with the tricycle 58, both switches 38 close and actuate the brake lock up valve 72 by sending direct current to it through line 73. When switches 38 are closed, current will flow from the 12 volt back up alarm 174 and the 12 volt back up lights 176 through line 60 and from 174 and 176 through line 60A and diode 177 to the common line 73 of valve 72 and instantaneously apply the brakes to stop the vehicle 12. Switch 75 is a bypass or inactivating switch which an operator can open manually when he does not want the control system to apply the brakes, e.g., when a garbage truck is backing into a garbage dump.

Figure 8:
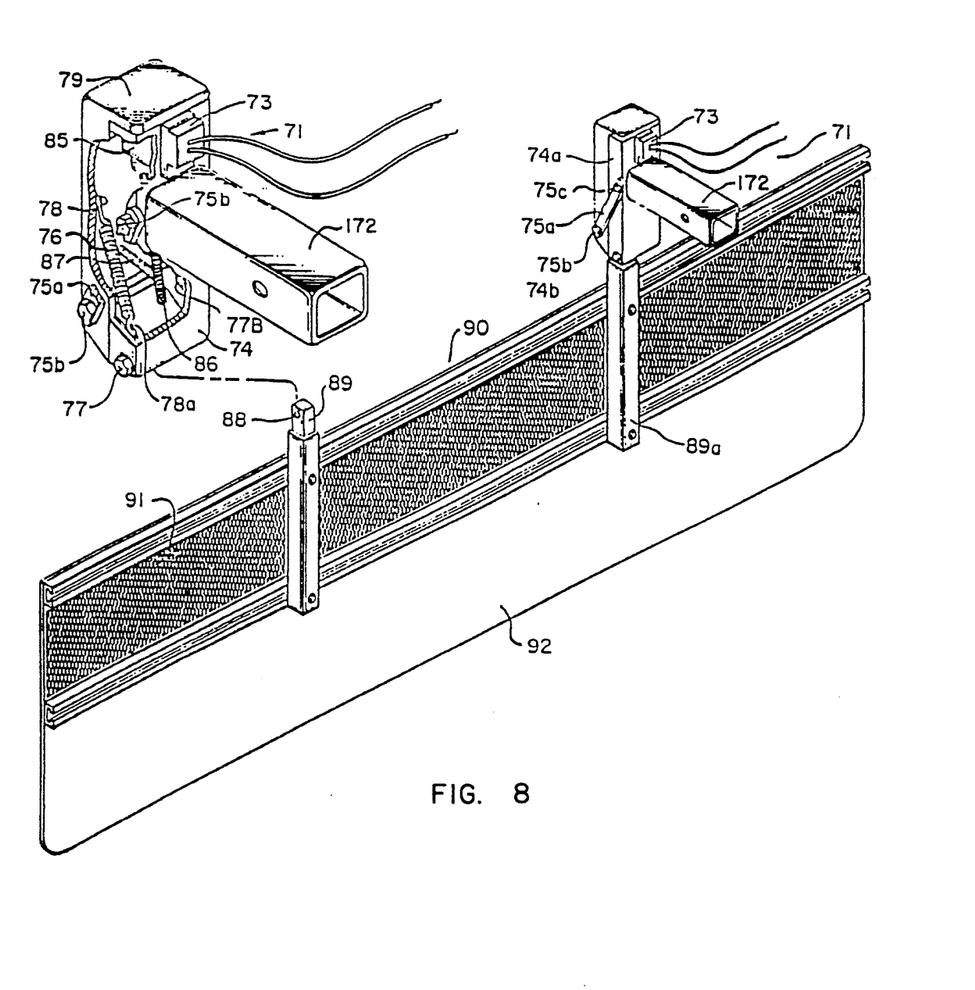
FIG. 8 is a fragmentary perspective view from the back of a vehicle control device having means, with parts at larger scale, having means for mounting it at the front or rear of a vehicle.

In the embodiment of the invention illustrated in FIG. 8, the control system comprises two identical box bases 74 and 74A. It will suffice to describe the structure and function of only box base 74 and associated parts since box base 74A and its associated parts have the same structure and function. Referring to box base 74, it is secured to the truck frame 172, e.g., by welding. Box base 74 carries switch 73 to which lines 71 are electrically connected. Switch 73 has essentially the same structure and function as switch 38 previously described. A cover 79 is attached to base 74 by links 75a, one on each side of the cover, which are pivoted at their lower ends to the cover by a bolt 75b and at their upper ends to the base 74 by a bolt 75c.

A spring 76 has one end 78 secured to cover 79 somewhat above the center thereof and the other end 78a secured to the base 74 near the bottom thereof, as seen in FIG. 8, yieldingly holding 79 against 74. A bolt 77 passing through base 74 near the bottom and back protects it from damage, as later described in detail. A bracket 85 is welded to base 74 opposite switch 73 adjacent to a push button (not shown) of the switch for opening and closing the internal terminals of wires 71. A lever 86, e.g., a coil spring, is pivotally attached at its upper end in position to move the push button when it swings, causing the switch to be open when it is henaging free and to close when swung away from the free hanging position. A push rod 87 is secured at one end to cover 79 and at its other end to lever 86 so that movement of cover 79 will swing lever 86 and close switch 73.

The bottom wall of cover 79 is provided with an opening through which the upper reduced end of bar 89 passes and is secured to 79 by bolt 75b. Bar 89 is attached to the flap 90 which has an upper rigid portion 91 where the attachment is made and a lower flexible portion 92. When flap 90 and bar 89 are pivoted upon contact with a foreign object in its path of movement, it causes switch 73 to close, send an electric current to brake lock up valve 72 (FIG. 7), and instantaneously apply the brakes of the vehicle to stop it.

Figure 9:
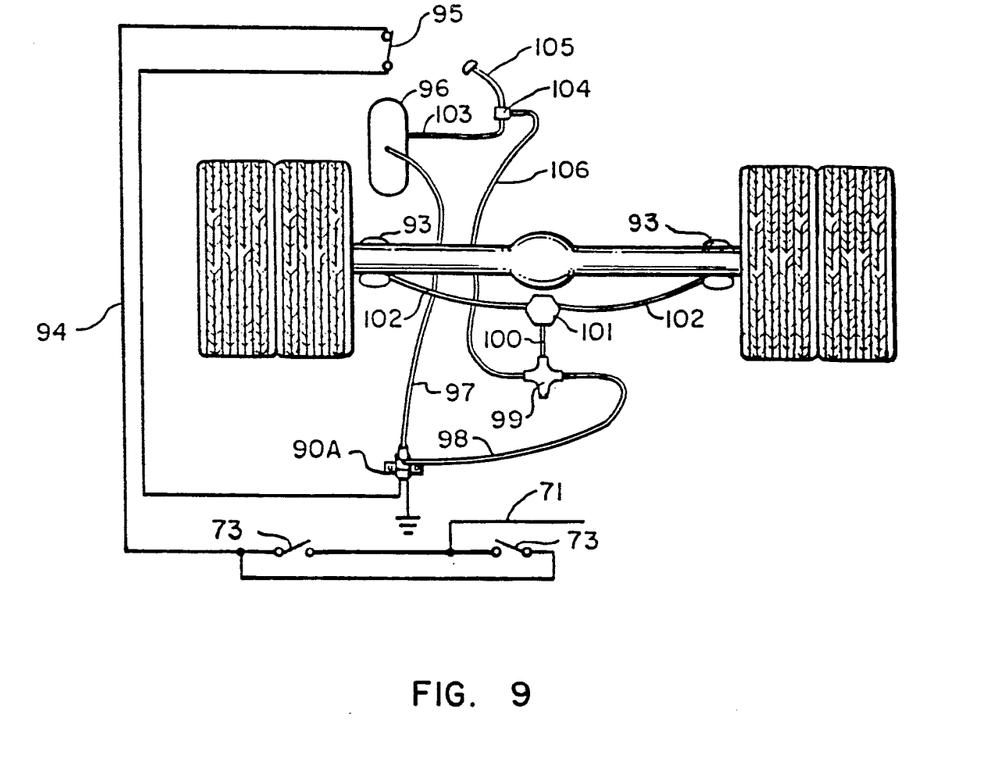
FIG. 9 is a schematic plan view of the rear axle and tires of a vehicle with the control system of the invention.
Figure 10:
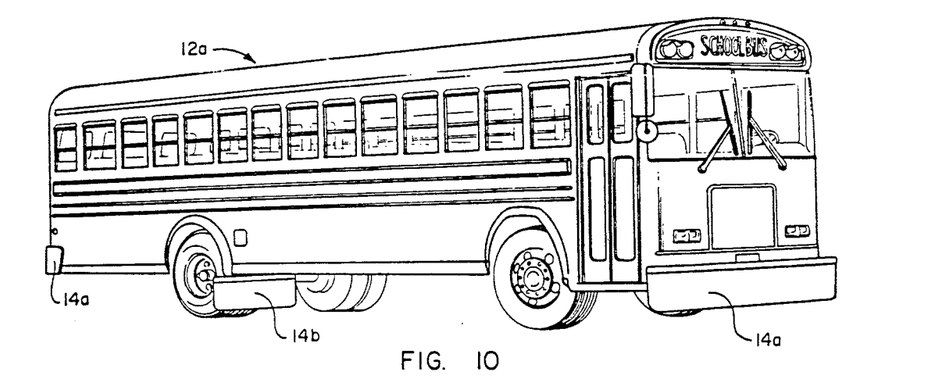
FIG. 10 is a perspective view of a school bus with a vehicle control device of the invention attached at the front and back of the vehicle and in front of the rear wheel on the right side thereof.

FIG. 9 shows a schematic representation of the rear axle and rear wheels of vehicle 12 with the control system installed. The system includes switches 73 in line 71. When switches 73 are closed (or either of them is closed) current flows from line 71 through a line 94 and a bypass switch 95 to a solenoid 90A. Bypass switch 95 is manually operable to inactivate the control system at times when the driver does not want it to operate automatically.

Activation of solenoid 90A permits compressed air to flow from air tank 96 through air line 97, valve 90A, and air line 98 to double check valve 99, through it and line 100 to relay valve 101 and through it and lines 102 to brakes 93 to stop the vehicle instantaneously. An air line 103 from air tank 97 connects to treadle valve 104 which is operable by treadle 105 to apply air pressure through line 106, double check valve 99, line 100, relay valve 101 and lines 102 to brakes 93 to apply them in the conventional way.

Referring now to the embodiment of the invention disclosed in FIGS. 10 to 19, the vehicle is illustrated as a school bus 12a to which a wide flap 14a has been attached at both the front and rear and a short flap 14b has been attached just in front of the rear tire. The wide flaps illustrated in FIG. 10 may be straight from end to end or may have end sections extending inwardly at a large angle to the straight center section and parallel to but somewhat spaced from the side of the bus for a short distance, e.g., up to about a foot. The short flap 14b has a similar end section extending rearwardly at a large angle somewhat parallel to but spaced from the side wall of the rear tire.

Figure 11:
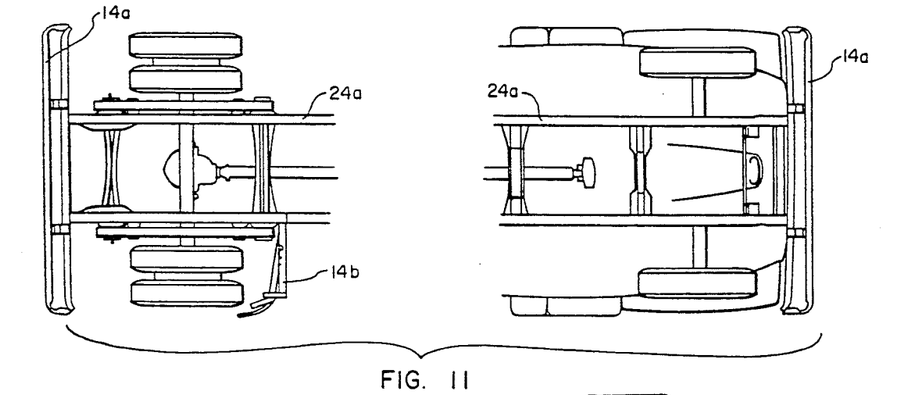
FIG. 11 is a top view of the chassis of the bus on a larger scale (with the center portion broken away) to show the three control devices mounted on it, one at the front, one at the back and one in front of the right tire.
Figure 13:
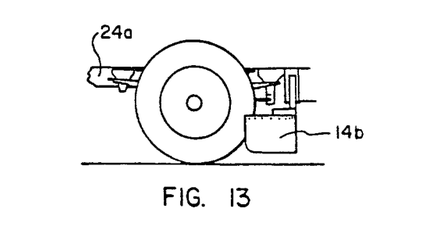
FIG. 13 is a partial side elevation of the chassis of the bus of FIG. 11 adjacent to the rear tire showing the manner of securing the control device to the chassis in front of the rear tire.
Figures 14, 15, 16:
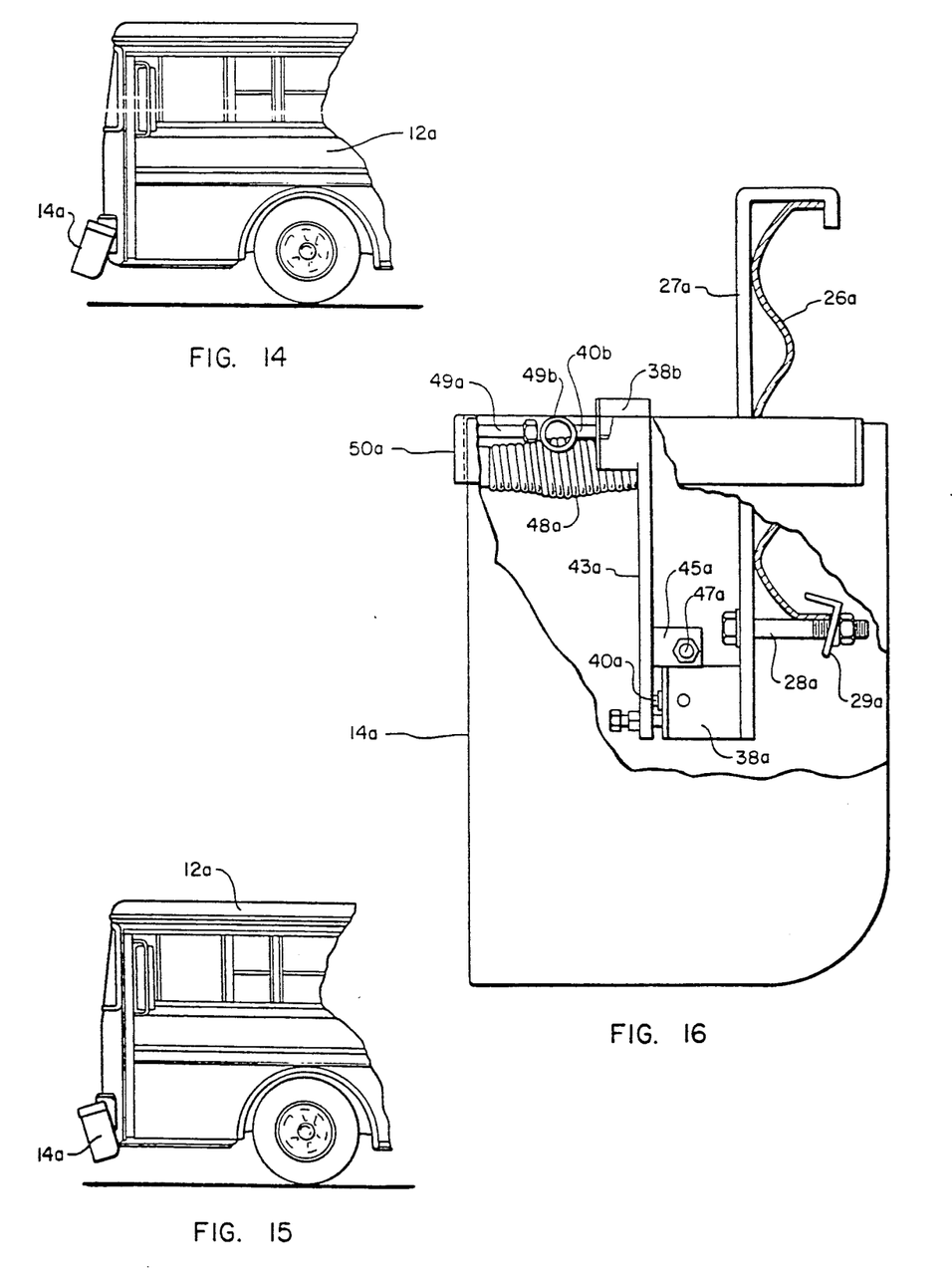
FIG. 14 is a partial side elevation of the left side of the front portion of the bus of FIG. 12 with the control device tilted clockwise or forwardly.
FIG. 15 is a partial side elevation of the left side of the front portion of the bus of FIG. 12 with the control device tilted counterclockwise or rearwardly.
FIG. 16 is a side elevation of a control device as seen from the right end with parts broken away to show the manner of connecting it to the bumper of a vehicle.
Figure 17:
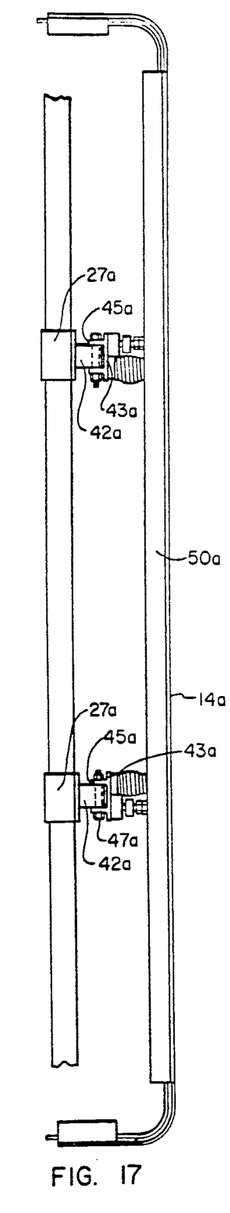
FIG. 17 is a top view of to the control device of FIG. 16 showing the manner of securing it on a bumper of a vehicle.
Figure 18:
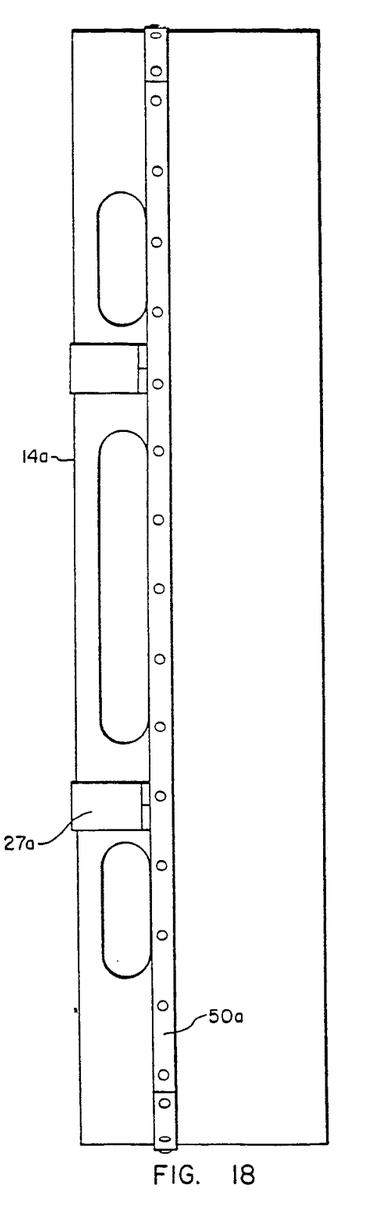
FIG. 18 is a front view of the bumper of the vehicle with a flap mounted thereon.
Figure 19:
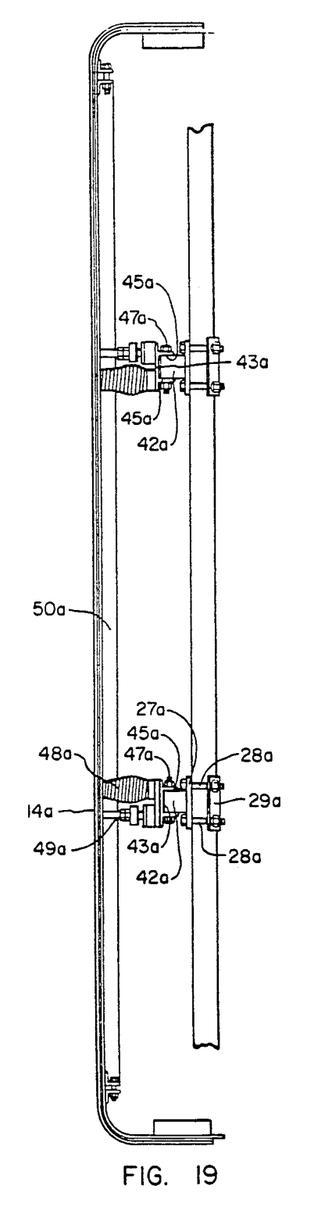
FIG. 19 is a top view of the control device of FIG. 16 showing the manner of mounting it on the other bumper of a vehicle.
Figure 20:
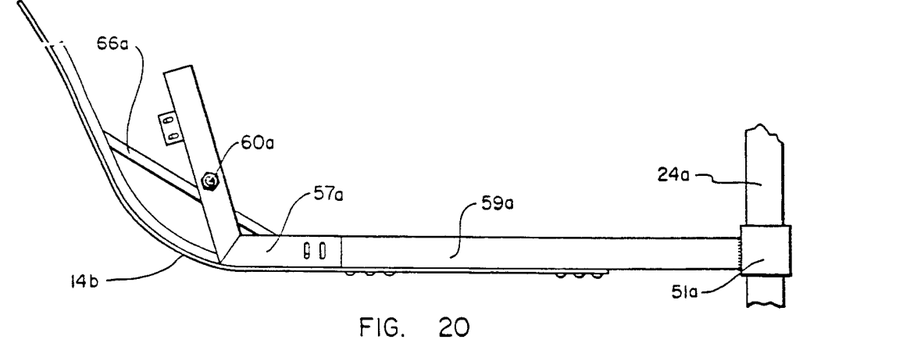
FIG. 20 is a plan view of a control device for the right rear wheel of a vehicle showing the manner of securing it to the frame.

The bus has a chassis 24a, as illustrated in FIGS. 11, 12, and 13, on which a bumper 26a is mounted at front and rear. These bumpers provide the mounting for the long flaps 14a by mounting means including J-shaped brackets 27a as illustrated in detail in FIG. 16 and which is more particularly described hereinafter. The short flap 14b is also mounted on the chassis 24a by mounting means including a flap support arm 57a as illustrated in FIGS. 20 to 22 and more particularly described hereinafter.

Referring now to FIGS. 12 and 16 to 19, the bumpers 26a are suitably secured to the chassis 24a at front and rear by mounting means including a J-shaped bracket 27a which hooks over the upper edge of the bumper, extends down below the lower edge thereof and is held tightly against its adjacent surface by a bolt 28a with the aid of an angle washer 29a. A switch 38a is secured to the lower end of the face of J-shaped bracket 27a opposite the bumper below the bolt 28a. It has a push button 40a to open and close the electrical contacts in it. Mounted on top of switch 38a is a pivot block 42a (FIGS. 17 and 19) which provides support for a pivoted lever 43a having two pivot arms 45a secured thereto between its upper and lower ends which extend over the sides of block 42a and a pivot bolt passes through suitable holes in block 42a and pivot arms 45a to complete the pivotal connection. The lower end of lever 45a extends below the push button 40A and, in the position illustrated in FIG. 16, depresses it and breaks the electrical contacts inside it. When the flap 14a is rotated clockwise around pivot bolt 47a by contact with a foreign object as the bus moves backwardly, as shown in FIG. 14, push button 40a is released because lever 43A is rotated clockwise releasing it to close the electrical circuit. Push button 40a is also released when the flap 14a is tilted backwards by contact with a large enough foreign object as shown in FIG. 15. The mounting means for flap 14a, which is illustrated in FIGS. 16, 17, 18, and 19, comprises a heavy spring 48a which has end plugs in each end which are bolted rigidly to the reinforcing bar 50E of the flap at one end and at the other end to lever 43A near its upper end. A bolt 49a is secured at one end to reinforcing rod 50A of flap 14a near the spring 48a with its other end extending rearwardly and connecting with a contact ring 49b which engages push button 40b The spring 48a biases the flap 14a to the position shown in FIGS. 10 and 12. If the flap 14a at the front of the bus encounters a foreign object in its forward movement, it is resiliently moved to the tilted position shown in FIG. 15. As soon as the object is moved, or the bus backs up a short distance, the flap 14a is returned to the position shown in FIG. 16 by spring 48a. The same operation occurs if the rear flap 14a encounters a foreign object in its rearward movement. In the event that rear flap 14a should encounter a foreign object in its forward movement, the flap is resiliently swung to the position illustrated in FIG. 14 which also releases push button 40a to send the signal to the brakes to apply them and stop the bus instantly.

Figure 24:
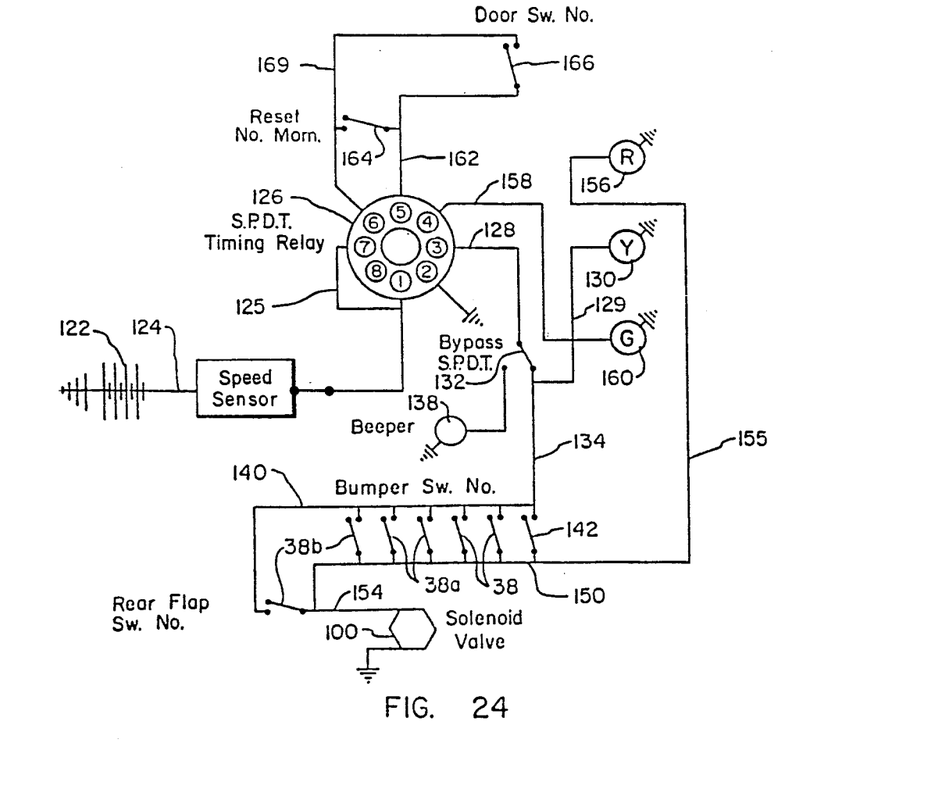
FIG. 24 is a schematic diagram of the electrical system adapted for control of forward and rearward movement of the vehicle, e.g., a school bus of the invention.

A second switch 38b is secured to the upper end of lever 43a. A push button actuating bar 49a is secured at one end to the reinforcing bar 50a of flap 14a with its other end connected to contact ring 49b which engages push button 40b of switch 38b. This structure provides means for closing the circuit to the actuating means if the flap should strike a foreign object such as a post or fence and be pushed backwardly without tilting. Switch 38b is connected in parallel in the same circuit as switch 38a, as seen in FIG. 24.

Figure 21:
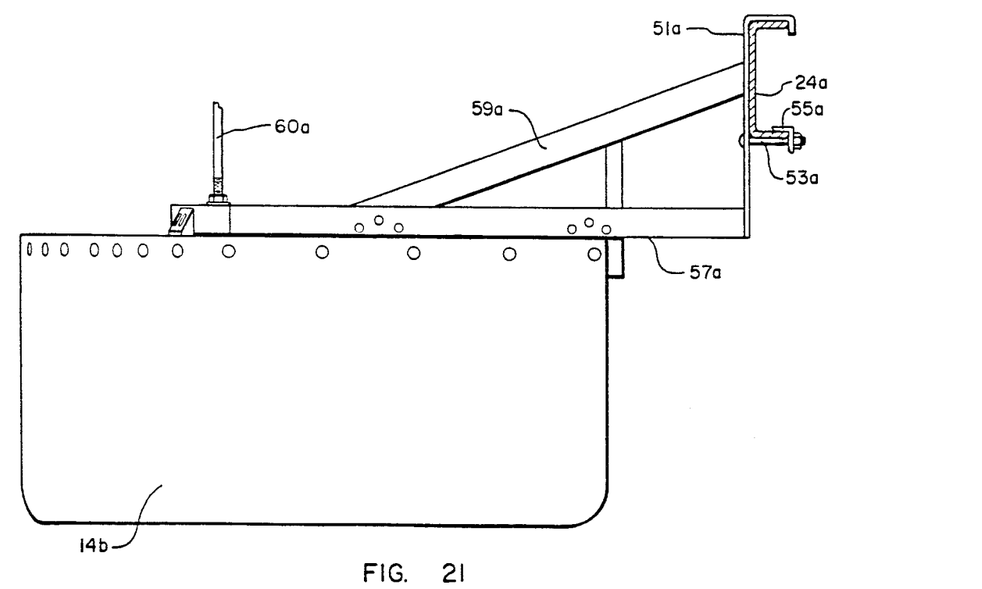
FIG. 21 is a front elevation of the control device of FIG. 20.
Figure 22:
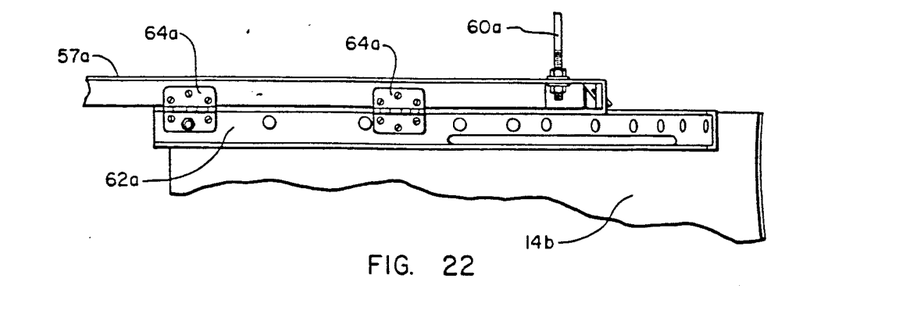
FIG. 22 is fragmentary elevation of the rear side of the device of FIG. 21 showing the hinge connection between the frame piece and the flap of the control device.

Flap 14b is secured to the chassis by a J-shaped bracket 51a that hooks over the top of channel-shaped frame member 24a, as seen in FIG. 21, and is secured thereto by a bolt 53a and angle washer 55a. The lower end of bracket 51a extends below frame member 24a to make connection, e.g., by welding, with a horizontal flap support arm 57a in the form of an angle iron having an upstanding wall to which one end of an angle brace 59a is connected at a point about half way along the straight part of the flap, as seen in FIG. 21, with the other end secured, e.g., by welding, to the vertical arm of bracket 51a. The free end of 57a extends rearwardly at an angle of at least about 60°, as illustrated in FIG. 20, and it may be supported, if desired, by a support rod 66a connected to a part of the chassis or vehicle body above it.

The flap 14b preferably has a reinforcing bar 62a along its upper edge to which one part of hinges 64a are secured, the other part being secured to the angle bar 57a, as best seen in FIG. 22. This places the flap 14b with its straight part in front of the rear tire and its curved end part extending rearwardly at an angle of at least about 60° as best seen in FIG. 20. A brace 66a is preferably provided extending between the reinforcing bar on the rearwardly extending part to the reinforcing bar on the straight part, as illustrated in FIG. 20.

Figure 23:
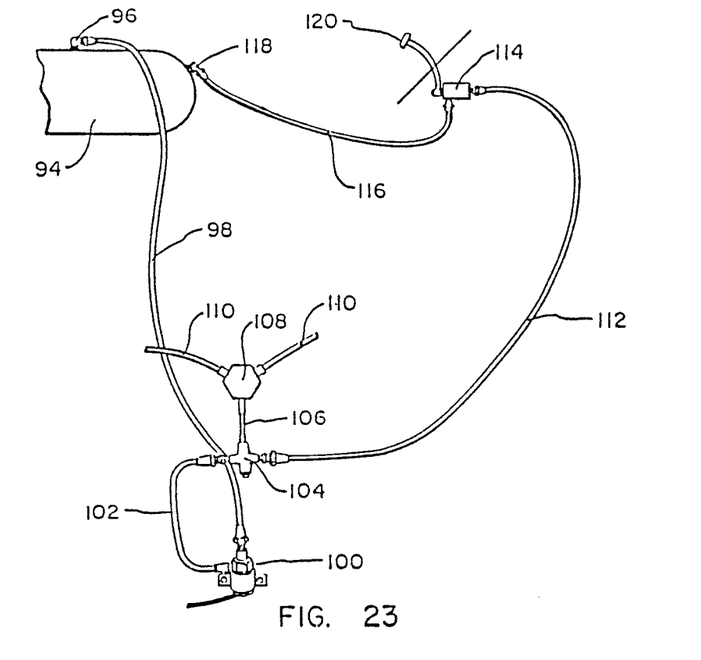
FIG. 23 is a schematic illustration of the air system used in the invention.

FIG. 23 illustrates the air line diagram for the brake lock up system. It comprises an air tank 94 having a pressure protection valve 96 connecting to an air line 98 leading to a solenoid valve 100. This valve must be mounted vertically. It is connected by airline 102 to a two-way check valve 104 and by electric line 154 to a source of current described hereinafter.

One outlet from valve 104 is connected to air line 106 leading to a relay valve 108 from which air lines 110 go to the brake pots 93 (FIG. 9).

The other outlet from valve 104 is connected by brake line 112 to a treadle valve 114 which receives air under pressure through line 116 which is connected to tank 94 by means of a fitting 118. Treadle valve 114 is operated by brake pedal 120. Depressing the brake pedal 120 opens treadle valve 114 sending compressed air through line 112 to two way check valve 104, through it, line 106, relay valve 108 and lines 110 to brakes 93 to stop the vehicle in the conventional way.

FIG. 24 illustrates the electrical wiring diagram for the brake lock up system. The vehicle battery 122 has one terminal grounded and the other connected to line 124 leading to position 1 of a multi-position relay 126. It is preferably a 12 pin S.P.D.T. with a short time locking shaft delay, e.g., of about 12 to 15 seconds. Position 1 has a jumper 125 to position 7. Position 2 is grounded. Position 3 is connected by line 128 and 129 to a yellow light 130 through a S.P.D.T. bypass 132. Yellow light 130, when illuminated, indicates that the system is activated. When bypass 132 is in the position shown in FIG. 24, it is connected to line 134. In the other position of 132 connects with the terminal of signal 138, e.g., a beeper, buzzer or other audible signal. In the position of 132 illustrated in FIG. 24, line 128 is connected through line 134 to the terminal of line 140 which has a plurality to switch terminals connected to it. One is the terminal for a manual inactivating switch 142 which enables an operator to inactivate the system if he does not want it to be operable when it otherwise would be. Two are terminals of switches 38 from the front flap 14a, two are terminals of switches 38a from the rear flap 14a, and two are terminals of switches 38b from the rear wheel flap 14b. The other terminals of all these switches connect to line 150. Line 150 connects (a) through line 154 to solenoid valve 100 described hereinabove, and (b) through line 155 to red light 156 which indicates that the brakes are locked. Position 4 of relay 126 is connected by line 158 to a green light 160 indicating that the system is off. Position 5 is connected by line 162 (a) to one terminal of reset NO. MOM 164 whose other terminal is connected by line 165 to position 6 and (b) to one terminal of door switch 168. The other terminal of door switch 168 is connected by line 169 to line 165 and the other terminal of reset NO. MOM. 164. When door switch 168 is open, as it is when the bus door is open, the system is dead so that the vehicle cannot be operated if the door to it is open. Operating switch 142 is manually controlled to open and inactivate the brake lock up system if the driver does not want it to operate when it otherwise would. To prevent operation of the brake lock up system on the highway, multi-position relay 126 includes a timer set for a predetermined short time interval, e.g., 12 to 15 seconds. At the start of the time interval the timer closes the circuit to the control system so that it is operable for this time interval. At the end of the time interval the timer breaks the circuit and inactivates the control system so that it cannot operate the brakes when the vehicle is on the highway.

On start of movement of the vehicle in forward or rearward direction the valve 142 is closed and yellow light 130 is illuminated. Push buttons 40 and 40a maintain switches 38 and 38a in open position until one of the flaps strikes a foreign object. This immediately closes at least one of switches 38 or 38a and operates solenoid valve 100 to supply air instantly to brake pots 93.

The device of the invention is intended to be operable only when the vehicle to which it is attached is beginning to move from a stationary position when the momentum of the vehicle is relatively low so that the application of the brakes brings the vehicle to an instant stop. This result follows if the speed does not greatly exceed a rate of about 7 miles per hour. In order to assure that the brakes are not applied at a higher speed, the control system is inactivated by the timer in multi-position relay 126 or by a speed limiting device of any suitable construction known to those skilled in this art.

Figure 25:
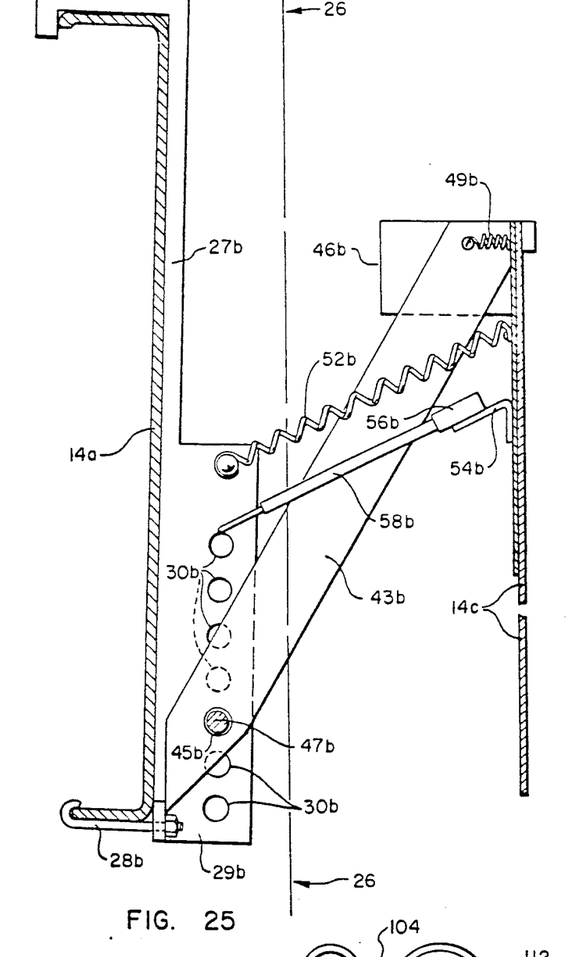
FIG. 25 is a side view of another embodiment of means for pivotally mounting a flap to the bumper of a vehicle.
Figure 26:
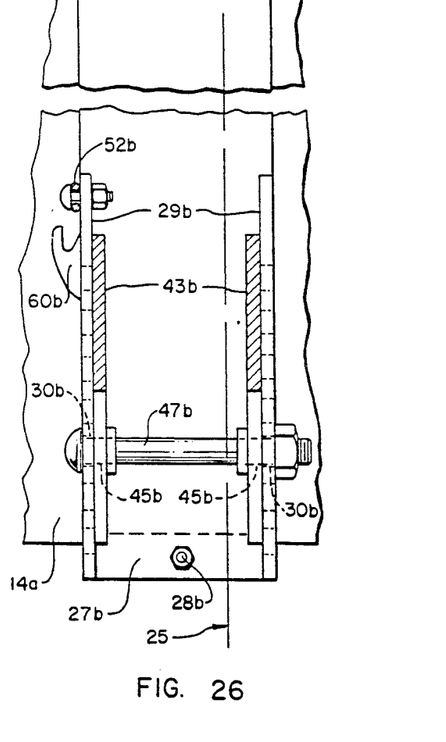
FIG. 26 is an elevational view of the back side of the channel member of the pivotal mounting of FIG. 25 which is secured to the upper portion of a flap and FIG. 27 is a schematic diagram of an alternate air over hydraulic brake system incorporating the invention.

FIGS. 25 and 26 illustrate another embodiment of flap supporting means adapted to be mounted on flap 14a. It comprises a J-shaped bracket 27b having its upper end hooked over the top edge of the bumper 14a to which it is held by a J-bolt 28b hooked over the lower edge of bumper 14a. Bracket 27b has narrow side walls on about the lower half with aligned holes to provide vertical adjustment of a steep angle brace 43b which has a hole in the lower end and a plate 45b at the upper end. A bolt 47b passes through the hole and a selected pair of holes in the side walls of 27b when the clearance of a flap later described is adjusted for desired clearance with the roadway. A flap 14c is resiliently held against plate 45b by a tension spring 49b anchored at one end to plate 45b and at the other end to the upper, reinforced edge of flap 14c. A stop 50b on plate 45b limits free movement of flap 14c rearwardly and assures substantially vertical normal position of the flap. Flap 14c is resiliently held against stop 50b by a strong coil spring 52b having one end hooked in the upper hole of the side wall of bracket 27b and the other end secured to the reinforced section of flap 14c just below plate 45b. A bracket 54b is secured to the reinforcing of flap 14c to hold securely a whisker switch 56b having its whisker extending beyond the near edge of the side wall of bracket 27b into the vicinity of a small contact plate 60b welded or otherwise secured thereto. The whisker touches plate 60b to close switch 56b and instantly apply the brakes of the vehicle when flap 14c is tilted by contact with a foreign object in the manner previously described. apply the brakes of the vehicle when flap 14c is tilted by contact with a foreign object in the manner previously described.

Figure 27:
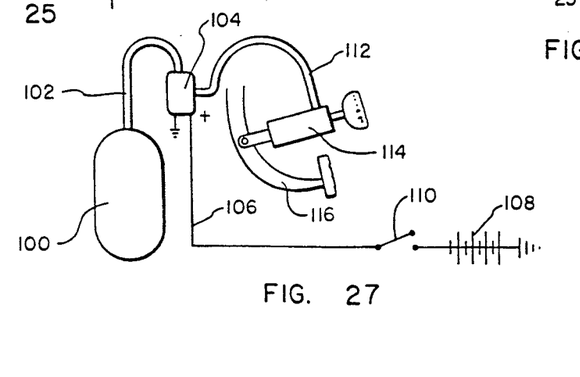

The air over hydraulic brake system of FIG. 27 comprises a compressed air supply 100. An air line 102 leading to a solenoid operated valve 104. Electric power is supplied to one terminal of solenoid 104 by a conductor 106 from a power source 108, e.g., a 12 volt battery having one terminal connected to 106 through switch 110 and its other terminal grounded. The other terminal of solenoid 104 is also grounded. Valve 104, when operated by the solenoid, sends compressed air through air line 112 to an air cylinder 114 connected to brake pedal 116. Switch 110 is operated by the brake control system of the invention. Thus, when any flap or sensor causes the brake control system to operate, it closes switch 110, automatically applies the brakes of the vehicle and stops it, as described above. A driver can apply the brakes with by depressing brake pedal 116 with his foot in the usual manner.

Although the invention has been described and illustrated in connection with certain specific embodiments thereof, those skilled in the art will understand that modifications and variations may be made without departing from the spirit of the invention as described above and as set forth in the claims.

Having thus described and illustrated the invention, what is claimed is:

1. An apparatus for use with a motor vehicle having a braking mechanism capable of stopping the vehicle, the apparatus comprising:
   means for detecting the presence of a foreign object in the path of the vehicle which object contacts the detecting means during operation of the vehicle;
   means for actuating the braking mechanism of the vehicle upon detection of the foreign object in the path of a vehicle; and
   means for deactivating the brake actuating means when a duration of time of operation of the vehicle from a stopped position exceeds a predetermined duration of time, the deactivation means comprising:
      means for monitoring the duration of time of operation of the vehicle from a stopped position; and
      means for deactivating the brake actuating means when the duration of time of the operation of the vehicle from a stopped position exceeds a predetermined duration of time.

2. An apparatus for use with a motor vehicle having a braking mechanism capable of stopping the vehicle, the apparatus comprising:
   a brake mechanism capable of braking the vehicle to a stop;
   means for detecting the presence of a foreign object in the path of the vehicle wherein the detecting means comprises a flap, the flap being adapted by pivoted movement to detect the presence of a foreign object when contacted by the foreign object;
   means for controlling the braking mechanism of the vehicle upon pivotal movement of the flap by contact with the foreign object; and
   means for deactivating the brake actuating means when a duration of time of operation of the vehicle from a stopped position exceeds a predetermined duration of time, the deactivation means comprising:
      means for monitoring the duration of time of operation of the vehicle from a stopped position; and
      means for deactivating the brake actuating means when the duration of time of the operation of the vehicle from a stopped position exceeds a predetermined duration of time.

3. An apparatus for use with a motor vehicle having a braking mechanism capable of stopping the vehicle, the apparatus comprising:
   means for detecting the presence of a foreign object in the path of the vehicle wherein the detecting means is pivotally mounted near the front of the rear tire or tires, the detection means comprising a flap adapted to detect the presence of the object in the path of the vehicle so that when the foreign object contacts the flap, the flat deflects;
   means for actuating the braking mechanism of the vehicle upon deflection of the flap by contact with the foreign object; and
   means for deactivating the brake actuating means when a duration of time of operation of the vehicle from a stopped position exceeds a predetermined duration of time, the deactivation means comprising:
      means for monitoring the duration of time of operation of the vehicle from a stopped position; and
      means for deactivating the brake actuating means when the duration of time of the operation of the vehicle from a stopped position exceeds a predetermined duration of time.

* * * * *